United States Patent
Perets et al.

(10) Patent No.: US 9,203,589 B1
(45) Date of Patent: Dec. 1, 2015

(54) ESTIMATION OF CHANNEL STATE INFORMATION (CSI) FEEDBACK USING INTERPOLATION

(71) Applicant: Marvell International, Ltd., Hamilton (BM)

(72) Inventors: Yona Perets, Ra'anana (IL); Ezer Melzer, Tel Aviv (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 153 days.

(21) Appl. No.: 14/043,867

(22) Filed: Oct. 2, 2013

Related U.S. Application Data

(60) Provisional application No. 61/710,405, filed on Oct. 5, 2012.

(51) Int. Cl.
*H04L 5/00* (2006.01)
(52) U.S. Cl.
CPC .......... *H04L 5/0057* (2013.01); *H04L 5/0048* (2013.01)
(58) Field of Classification Search
CPC ..... H04L 5/005; H04L 5/0051; H04L 5/0053; H04L 5/0057; H04L 5/006; H04L 5/0048
See application file for complete search history.

(56) References Cited

U.S. PATENT DOCUMENTS

| | | | |
|---|---|---|---|
| 8,644,262 B1 * | 2/2014 | Sun et al. | 370/333 |
| 8,675,794 B1 * | 3/2014 | Perets et al. | 375/349 |
| 8,861,662 B1 * | 10/2014 | Perets et al. | 375/349 |
| 2006/0135080 A1 * | 6/2006 | Khandekar et al. | 455/69 |
| 2006/0268976 A1 * | 11/2006 | Baum et al. | 375/239 |

OTHER PUBLICATIONS

3GPP TS 36.213, "3rd Generation Partnership Project, Technical Specification Group Radio Access Network; Evolved Universal Terrestrial Radio Access (E-UTRA); Physical Layer Procedures", Release 11, version 11.4.0, pp. 1-182, Sep. 2013.

Ericsson, "System-Level Evaluation of OFDM—Further Considerations", TSG-RAN WG1 #35, R1-031303, 6 pages, Lisbon, Portugal, Nov. 17-21, 2003.

Lucent Technologies, "Link Error Prediction for E-DCH", TSG-RAN WG1#35, R1-031276, 9 pages, Lisbon, Portugal, Nov. 17-21, 2003.

(Continued)

*Primary Examiner* — Paul H Masur
*Assistant Examiner* — Kabir Jahangir

(57) ABSTRACT

A method includes receiving reference signals in a mobile communication terminal, the mobile communication terminal being designed to receive data-carrying signals that are transmitted from a base station using one of multiple predefined Modulation and Coding Schemes (MCSs). Based on the received reference signals, using processing circuitry in the terminal, effective Signal to Noise Ratios (SNRs) are calculated for the MCSs in a predefined partial subset of the MCSs that does not include all MCSs. The effective SNRs, for the MCSs that are not part of the predefined partial subset, are estimated by interpolating among two or more calculated effective SNR measures of the MCSs in the predefined partial subset using an interpolation function. Channel feedback is calculated based on the calculated effective SNRs and the estimated effective SNRs. The channel feedback is transmitted from the terminal, for use in transmitting the data carrying signals from the base station.

16 Claims, 3 Drawing Sheets

(56) References Cited

OTHER PUBLICATIONS

3GPP TR 25.892, "3rd Generation Partnership Project;Technical Specification Group Radio Access Network; Feasibility Study for Orthogonal Frequency Division Multiplexing (OFDM) for UTRAN enhancement" (Release 6), V6.0.0, pp. 1-91, Jun. 2004.

Nortel Networks, "OFDM Exponential Effective SIR Mapping Validation, EESM Simulation Results for System-Level Performance Evaluations", 3GPP TSG-RAN-1/TSG-RAN-4 Ad Hoc, R1-Apr. 0089, 6 pages, Espoo, Finland, Jan. 27-30, 2004.

* cited by examiner

US 9,203,589 B1

ESTIMATION OF CHANNEL STATE INFORMATION (CSI) FEEDBACK USING INTERPOLATION

CROSS-REFERENCE TO RELATED APPLICATIONS

This application claims the benefit of U.S. Provisional Patent Application 61/710,405, filed Oct. 5, 2012, whose disclosure is incorporated herein by reference.

FIELD OF THE DISCLOSURE

The present disclosure relates generally to communication systems, and particularly to efficient computation of Channel State Information (CSI).

BACKGROUND

In many communication systems, a receiver receives signals from a transmitter over a communication channel, estimates Channel State Information (CSI) of the channel, and sends to the transmitter feedback that is indicative of the estimated CSI. The transmitter adapts the signals transmitted to the receiver based, at least in part, on the CSI feedback.

CSI feedback is used, for example, in Evolved Universal Terrestrial Radio Access (E-UTRA) systems, also referred to as Long Term Evolution (LTE) systems. The Third Generation Partnership Project (3GPP) E-UTRA standards specify CSI feedback for use by E-UTRA User Equipment (UE) and base stations (eNodeB). These schemes are described, for example, in 3GPP Technical Specification 36.213, entitled "Technical Specification Group Radio Access Network; Evolved Universal Terrestrial Radio Access (E-UTRA); Physical Layer Procedures (Release 11)," (3GPP TS 36.213), version 11.4.0, September 2013, which is incorporated herein by reference.

The description above is presented as a general overview of related art in this field and should not be construed as an admission that any of the information it contains constitutes prior art against the present patent application.

SUMMARY

An embodiment that is described herein provides a method including receiving reference signals in a mobile communication terminal, the mobile communication terminal being designed to receive data-carrying signals that are transmitted from a base station using one of multiple predefined Modulation and Coding Schemes (MCSs). Based on the received reference signals, using processing circuitry in the mobile communication terminal, effective Signal to Noise Ratios (SNRs) are calculated for the MCSs in a predefined partial subset of the MCSs that does not include all MCSs. The effective SNRs, for the MCSs that are not part of the predefined partial subset, are estimated by interpolating among two or more calculated effective SNR measures of the MCSs in the predefined partial subset using an interpolation function. Channel feedback is calculated based on the calculated effective SNRs and the estimated effective SNRs. The channel feedback is transmitted from the terminal, for use in transmitting the data carrying signals from the base station.

In some embodiments, calculating the effective SNRs includes measuring a plurality of SNRs in respective time-frequency bins, and applying an Exponential Effective Signal to Interference and Noise Ratio Mapping (EESM) process to the SNRs. In other embodiments, each of the multiple MCSs is associated with a respective modulation scheme and a respective coding scheme, and estimating the effective SNRs includes estimating an effective SNR for a given MCS by interpolating, using the interpolation function, among two or more effective SNR measures of respective MCSs having a same modulation scheme as the given MCS.

In yet other embodiments, estimating the effective SNRs includes measuring a plurality of SNRs in respective time-frequency bins, deriving each of the effective SNR measures by calculating a sum of exponents of the SNRs and taking a logarithm of the sum of exponents, and interpolating among two or more sums of exponents using the interpolation function, and estimating the effective SNRs by taking the logarithm of each of the respective interpolated sums of exponents.

In an embodiment, the effective SNR measures include the respective effective SNRs, and estimating each of the effective SNRs includes interpolating among two or more effective SNRs using the interpolation function. In another embodiment, the interpolation function includes a linear interpolation function. In yet another embodiment, calculating the effective SNRs includes calculating the effective SNRs as a function of respective values of an averaging parameter β assigned to the MCSs.

There is additionally provided, in accordance with an embodiment that is described herein, apparatus including a receiver, processing circuitry and a transmitter. The receiver is configured to receive reference signals from a base station, and to receive from the base station data-carrying signals that are transmitted using one of multiple predefined Modulation and Coding Schemes (MCSs). The processing circuitry is configured to calculate, based on the received reference signals, effective Signal to Noise Ratios (SNRs) for the MCSs in a predefined partial subset of the MCSs that does not include all MCSs, to estimate the effective SNRs for the MCSs that are not part of the predefined subset by interpolating among two or more effective SNR measures of the MCSs in the predefined partial subset using an interpolation function, and to calculate channel feedback based on the calculated effective SNRs and the estimated effective SNRs. The transmitter is configured to transmit the channel feedback from the terminal, for use in transmitting the data carrying signals from the base station.

In some embodiments, a mobile communication terminal includes the disclosed apparatus.

In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
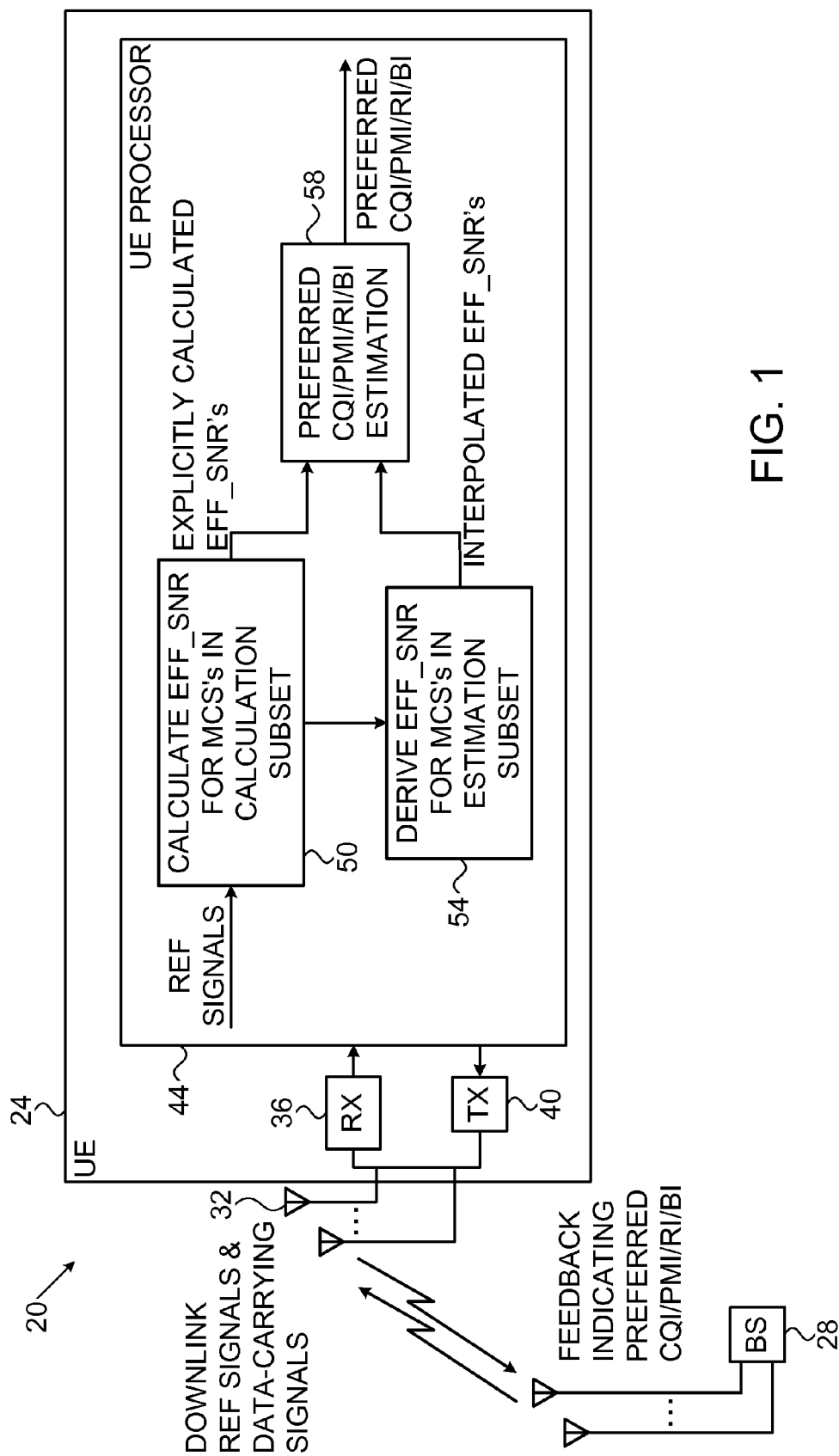
FIG. 1 is a block diagram that schematically illustrates a communication system, in accordance with an embodiment that is described herein.

In LTE systems, each User Equipment (UE) is required to provide the Base Station (BS) with Channel State Information (CSI). In accordance with the LTE specifications, the BS configures the UEs (e.g., on initialization or by periodic signaling) to provide the specific type(s) and timing of the CSI feedback. The BS uses the CSI feedback for adapting subsequent transmissions to the UEs, for example in making scheduling and link adaptation decisions. In the CSI feedback, the UE typically indicates certain preferred parameters within the BS transmission scheme, typically the parameters that the UE prefers the BS to use in subsequent transmissions to the UE. In the present context, the term "BS transmission scheme" refers to any parameter or parameters defining the BS transmission.

According to the TS 36.213 specification, cited above, the CSI feedback potentially includes parameters such as one or more preferred Channel Quality Indices (CQI—corresponding to preferred Modulation and Coding Schemes—MCS—of the BS), one or more preferred Precoding Matrix Indices (PMI), preferred transmission rank (a preferred number of spatial streams, referred to as Rank Index—RI), and/or indices of preferred spectral sub-bands (referred to as Band Index—BI). The format (and therefore the content) of the CSI feedback provided by a particular UE typically depends on the transmission mode of the BS (e.g., spatial multiplexing vs. transmit diversity) and on a reporting mode that is specified for the UE. A given UE is typically required to support multiple CSI feedback formats within a certain operation time interval, and should therefore be designed to respond to a wide range of CSI feedback requests from the BS.

As can be understood from the description above, the total number of possible combinations of feedback parameters, out of which the UE should identify a few preferred combinations, is very large. Moreover, in evaluating each of the different parameter combinations, the UE is typically required to calculate respective effective signal to noise ratio (SNR) values for all MCS schemes. The calculation of effective SNR typically involves complex summation and exponentiation operations, which impose considerable computational effort on the UE. Performing such an exhaustive search process is often beyond the computational capabilities of the UE. Exhaustive evaluation at a reduced accuracy (e.g., by skipping one or more of the parameter combinations and/or MCS schemes), on the other hand, would degrade the feedback quality and may violate the LTE specifications requirements.

Embodiments that are described herein provide improved methods and devices for calculating CSI feedback in mobile communication terminals. The disclosed techniques reduce the computational burden involved in calculating effective SNR with little or no degradation in feedback accuracy.

In an embodiment, a predefined set of MCSs is divided into two disjoint subsets, referred to as a calculation subset and an estimation subset. The UE explicitly calculates effective SNR values for MCSs in the calculation subset, using some predefined formula or algorithm. For MCSs in the estimation subset, however, the UE derives estimated effective SNR values by interpolating effective SNR measures derived over MCSs in the calculation subset. In an embodiment, the SNR measures comprise already calculated effective SNR values in the calculation subset. The interpolation operation is considerably computationally simpler than the explicit calculation, and therefore the disclosed techniques significantly reduce the computational burden on the UE. In the description that follows and in the claims, the term "interpolation" refers to the operation of combining two or more given indexed values to derive an additional indexed value (the interpolated value) whose index is between the indices of the given indexed values.

In some embodiments, the predefined formula for calculating the effective SNR involves taking the logarithm of a sum of exponents. In an embodiment, instead of interpolating the effective SNR values themselves, the UE derives effective SNR measures using estimation of interpolated sums of exponents for MCSs in the estimation subset. The estimation is carried out by interpolating sums of exponents that are calculated for MCSs in the calculation subset. In such embodiments, each estimated effective SNR is derived from the respective interpolated sum of exponents. This form of interpolation is typically highly accurate, since the sum of exponents is closer to a linear function than the effective SNR itself (as a function of the MCS index). Nevertheless, the disclosed techniques can be used with any other suitable kind of interpolation.

In the disclosed techniques, the estimated effective SNR values derived by interpolation replace the explicit calculations (for MCSs in the estimation subset). The estimation, however, is very close to the explicit calculation and therefore the accuracy of calculating the CSI feedback is maintained. By using the methods and devices described herein, mobile communication terminals can calculate CSI feedback with high accuracy using modest computational power.

FIG. 1 is a block diagram that schematically illustrates a communication system 20 that uses CSI feedback, in accordance with an embodiment that is described herein. In the present example, system 20 comprises an E-UTRA (LTE) system that operates in accordance with the TS 36.213 specification, cited above. In alternative embodiments, however, system 20 may operate in accordance with any other suitable communication standard or specification that employs CSI feedback, such as, for example, UMTS Terrestrial Radio Access (UTRA) systems (also sometimes referred to as Wideband Code Division Multiple Access—WCDMA), Wireless Local Area Networks (WLANs) and WiMAX systems.

System 20 comprises a mobile communication terminal, in the present example an LTE UE 24. UE 24 communicates with a BS 28. Among other tasks, the UE receives from the BS downlink signals, which comprise reference signals, optionally data-carrying signals, and possibly additional signals as well. The data-carrying signals convey user data, signaling and other information from the BS to the UE. The reference signals comprise pilot signals that do not carry data or signaling, and are used for synchronization, channel estimation and other measurements.

In an embodiment, at a given instant, the BS transmits a given data-carrying signal to a given UE using a certain transmission scheme. In an embodiment, the BS modulates and encodes the data using a certain Modulation and Coding Scheme (MCS) that the BS selects from a predefined set of MCSs. Each MCS in the set is characterized by a certain throughput and a certain Spectral Efficiency (SE). The supported range of SE values typically corresponds to a range of respective Channel Quality Indices (CQIs), so that each one of the CQI values in a predefined CQI set corresponds to a certain MCS in the predefined MCS set. (For that reason, the terms "CQI" and "preferred MCS" are occasionally used interchangeably below. Each MCS is therefore referred to as corresponding to a certain SE.)

In some embodiments, the BS comprises multiple antennas, and the downlink signals comprise Multiple-Input Multiple-Output (MIMO) signals. In these embodiments, the BS typically precodes the downlink signals (i.e., adjusts the gain and phase of the signals delivered to the different antennas) using a certain precoding scheme that is represented by a precoding matrix. The matrix is typically selected from a predefined set of matrices, referred to as a codebook, and each matrix in the codebook is identified by a respective Precoding Matrix Index (PMI).

In some embodiments, the BS maps the downlink signals onto a certain number of spatial streams (also referred to as spatial layers) that are transmitted in parallel. The number of spatial layers is referred to as a transmission rank or Rank Index (RI). In some embodiments, the frequency range allocated to the BS is sub-divided into multiple spectral sub-bands, and the BS transmits a given data-carrying signal on a certain subset of one or more spectral sub-bands. The sub-bands are identified using Band Indices (BI).

Thus, the transmission scheme of the BS is typically specified by a certain set of MCS (CQI), PMI, RI and BI values, or a subset of one or more of these parameters. In addition, in an embodiment the BS transmits in one of multiple transmission modes, e.g., a spatial multiplexing mode or a transmit diversity mode.

In some embodiments, UE 24 is configured by BS 28 to calculate and provide CSI feedback. The CSI feedback is indicative of the characteristics of the communication channel between the BS and the UE, and/or of the BS transmission scheme that is preferred by the UE for receiving data-carrying signals from the BS over this channel. In some embodiments, the CSI feedback comprises a preferred MCS, preferred PMI, preferred RI, preferred BI, or any subset comprising one or more of these parameters. In some embodiments, the UE selects the BS transmission scheme (e.g., MCS, PMI, RI and/or BI) that provides maximum throughput of the data-carrying signals (maximum spectral efficiency), while satisfying a constraint set on the error probability of the data-carrying signals. In an example embodiment, the UE selects the BS transmission scheme that maximizes downlink throughput while maintaining a Block Error Rate (BLER) of no more than 10%. In alternative embodiments, other error rate constraints can be used.

In some embodiments, the BS configures the UE with a certain reporting format, which specifies the requested format (and therefore the content) of the CSI feedback. The CSI feedback format may also depend on the transmission mode of the BS (e.g., spatial multiplexing or transmit diversity).

In the example embodiment of FIG. 1, UE 24 comprises one or more antennas 32, a receiver (RX) 36, a transmitter (TX) 40 and a UE processor 44. Receiver 36 receives the downlink signals from BS 28, including the reference signals and the data-carrying signals, via antennas 32. Processor 44 calculates the CSI feedback using methods that are described in detail below. Transmitter 40 transmits the CSI feedback to BS 28. The BS uses the CSI feedback in producing the downlink signals, e.g., in making scheduling and link adaptation decisions to be employed in subsequent transmissions.

In some embodiments, UE processor 44 calculates the CSI feedback by processing the reference signals, since the received reference signals are indicative of the characteristics of the communication channel (e.g., channel response and noise). In an embodiment, the CSI feedback calculation does not consider the data-carrying signals, and does not depend on the quality at which the data-carrying signals are received, if at all.

In some embodiments, processor 44 selects a preferred MCS by evaluating one or more of the predefined MCSs. Processor 44 typically scans the set of predefined MCSs in an attempt to find the MCS having the highest spectral efficiency (highest throughput) that still satisfies the error rate constraint (e.g., BLER≤10%).

When considering a particular MCS during the MCS scanning process, the UE processor typically evaluates a respective measure that is indicative of the spectral efficiency of that MCS. In the description that follows, the evaluated measure of a given MCS comprises the spectral efficiency of that MCS. Alternatively, however, the measure may comprise any other suitable metric that is indicative of the spectral efficiency. Based on the evaluated measures, the UE processor selects a preferable MCS and indicates the preferred MCS to the BS.

The spectral efficiency (SE) of a given MCS is related to an effective SNR that is associated with this MCS. Thus, evaluating the scanned MCSs involves evaluating respective effective SNRs. In an embodiment, UE processor 44 divides the predefined set of MCSs into a calculation subset and an estimation subset. An effective SNR calculation unit 50 explicitly calculates effective SNR values for MCSs in the calculation subset. For MCSs in the estimation subset, an effective SNR estimation unit 54 interpolates the effective SNR values (that were calculated explicitly for MCSs in the calculation subset) to derive estimated effective SNR values. Both the calculated and estimated effective SNRs are input to a preferred CSI estimation unit 58, which evaluates MCS-dependent SEs to select a preferred set of BS transmission parameters.

The techniques outlined above for evaluating effective SNR are described solely by way of example. In alternative embodiments, UE processor 44 may use various other techniques for reducing the complexity of deriving effective SNRs and therefore the complexity of selecting preferred combinations of feedback parameters. For example, the UE processor may apply any suitable methods for calculating effective SNRs in the calculation subset. As another example, the UE may apply any suitable interpolation method (or even estimation methods other than interpolation) to derive estimated effective SNRs in the estimation subset. Certain additional aspects of reducing the complexity of CSI calculations are addressed in U.S. patent application Ser. No. 12/902,168, filed Oct. 12, 2010, which is assigned to the assignee of the present patent application and whose disclosure is incorporated herein by reference.

Figure 2:
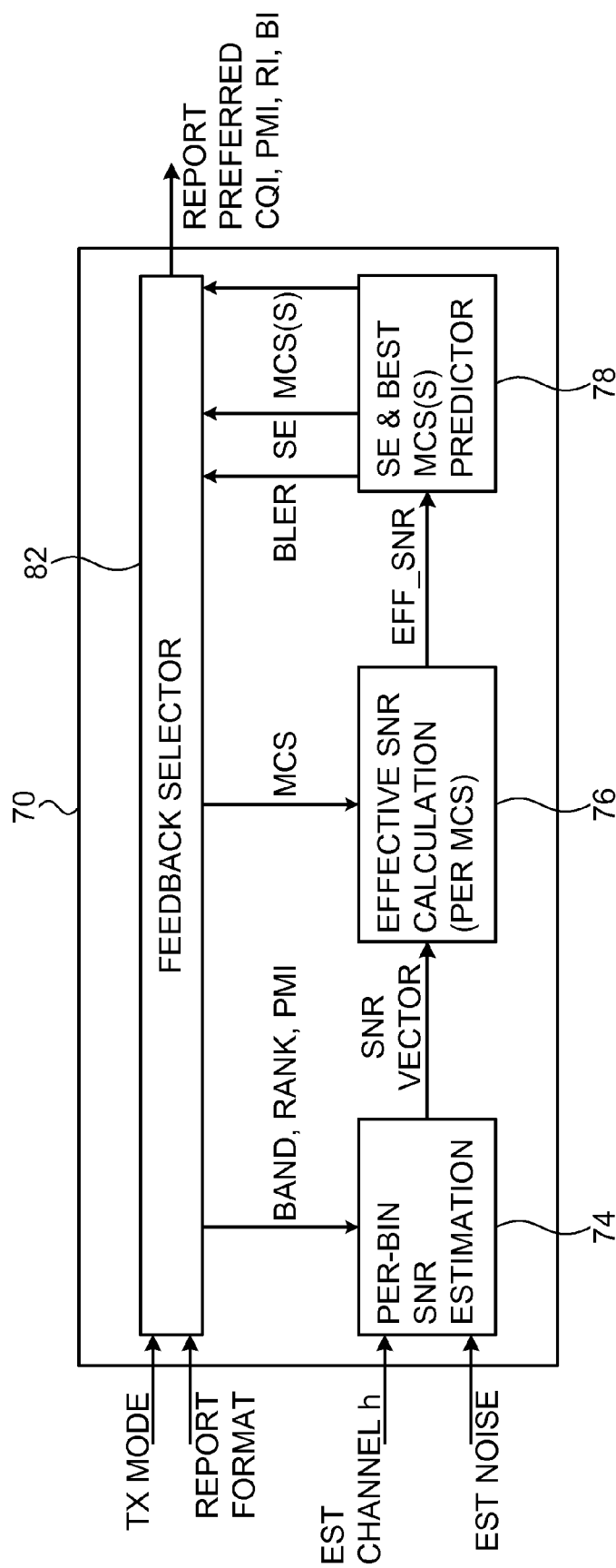
FIG. 2 is a block diagram that schematically illustrates a CSI feedback estimation unit in the communication system of FIG. 1, in accordance with an embodiment that is described herein.

FIG. 2 is a block diagram that schematically illustrates a CSI feedback estimation unit 70, in accordance with an embodiment that is described herein. Unit 70 is implemented as part of UE processor 44 of FIG. 1 above, in an embodiment. In other words, in this embodiment the operations shown in FIG. 2 are executed by processor 44 of FIG. 1. Although the blocks in FIG. 1 and FIG. 2 are organized with different emphasis, for the sake of clarity, the end-to-end functionality is similar. For example, the inputs to block 74 in FIG. 2 are derived from the reference signals input to block 50 of FIG. 1. As another example, the EFF_SNR output of block 76 in FIG. 2 comprises both the outputs of blocks 50 and 54 in FIG. 1. Additionally, blocks 78 and 82 in FIG. 2 jointly perform the task of block 58 in FIG. 1.

In the present example, unit 70 comprises a Signal-to-Noise Ratio (SNR) estimation unit 74, which estimates SNR as a function of time and frequency. In an embodiment, unit 74 estimates the SNR for one or more time-frequency bins (sometimes referred to as resource elements—REs). In an embodiment, although not necessarily, unit 74 estimates the SNR in one or more REs used for transmitting the downlink signals, e.g., REs occupied by reference signals.

Unit 74 receives an estimate of the MIMO communication channel response (denoted h) and an estimate of the noise covariance at the receiver. Both estimates are calculated by processor 44 based on the received reference signals. Based on the channel response and noise estimates, unit 74 calculates an SNR vector that estimates the SNR for the different time-frequency bins (possibly per spatial stream, when multi-stream transmission is applicable).

An effective SNR calculation unit 76 accepts from unit 74 the SNR vector as input, and calculates a respective effective SNR (EFF_SNR) for each MCS. Methods for efficient calculation of the effective SNR values (e.g., by unit 76) are described further below.

The EFF_SNR values are provided as input to a SE & MCS predictor unit 78. Unit 78 estimates the Spectral Efficiency (SE) for each MCS using any suitable method. In some embodiments, unit 78 estimates SE per each MCS by first translating EFF_SNR(MCS) to a respective predictive BLER (MCS).

A feedback selection unit 82 calculates the preferred CSI feedback based on the estimated spectral efficiencies provided by unit 78. In an embodiment, unit 82 selects the MCS having the highest SE while meeting a predefined error rate constraint (e.g., a Block Error Rate—BLER—of 10% or smaller). In some embodiments, unit 82 also calculates the preferable PMI, RI and/or BI. The identity of the CSI feedback parameters and/or the selection criteria may also depend on the transmission mode of the BS (e.g., spatial multiplexing vs. transmit diversity) and/or the reporting mode that is specified for the UE. Unit 82 outputs the preferred CQI (MCS), PMI, RI and/or BI, and UE processor 44 provides this CSI feedback to transmitter 40 (FIG. 1) for transmission to BS 28.

In an embodiment, unit 76 estimates the effective SNR, and unit 78 estimates the SE and the associated BLER of a given MCS, using any suitable method. In an example embodiment, unit 76 estimates the effective SNR using Exponential Effective SNR Mapping (EESM), where SNR stands for Signal to (Interference and) Noise Ratio. EESM is described, for example, in "System-Level Evaluation of OFDM—Further Considerations," Document R1-031303, TSG-RAN WG1 #35 meeting, Lisbon, Portugal, Nov. 17-21, 2003, which is incorporated herein by reference in its entirety. In another example embodiment, unit 78 uses methods that are based on Mutual Information (MU). MU methods are described, for example, in "Link Error Prediction for E-DCH," Document R1-031276, 3GPP TSG-RAN WG1 meeting, Lisbon, Portugal, Nov. 17-21, 2003, which is incorporated herein by reference in its entirety.

In an example embodiment, system 20 uses a predefined set of MCSs, which is divided into two disjoint subsets. One subset is referred to herein as a calculation subset and the other as an estimation subset. The calculation subset comprises MCSs for which unit 76 explicitly calculates effective SNR values (e.g., using EESM). For MCSs in the estimation subset, unit 76 efficiently derives estimated effective SNR values by interpolation as explained further below. In some embodiments, the functionality in unit 76 in which the effective SNR is separately derived in the calculation and estimation subsets, is carried out by respective units 50 and 54 of FIG. 1.

In the EESM calculation, unit 76 calculates the effective SNR of each MCS in the calculation subset by evaluating:

$$\text{EFF\_SNR}(MCS) = -\beta(MCS) \cdot \log\left[\frac{1}{N} \cdot \sum_{k=1}^{N} e^{-snr(k)/\beta(MCS)}\right] \quad \text{Equation 1}$$

wherein snr denotes the SNR vector, N denotes the size of the SNR vector, β denotes an averaging coefficient that depends on the MCS, and MCS denotes the index of the MCS in question. The N elements of vector snr comprise SNR values (on a linear scale, as opposed to a logarithmic scale such as measured in decibels [dB]), which respectively correspond to the time-frequency bins (or a statistically representative subset thereof) over which the downlink signals are transmitted. The SNR values, as explained above, are computed based on the channel response and noise estimates. For LTE release 8 systems, for example, the MCS (or CQI) index accepts values between one and fifteen, i.e., the predefined set of MCSs comprises fifteen MCSs, which are indexed by the integers 1, 2, . . . , 15.

The calculation of Equation [1] is based on EESM, as applied to the LTE Orthogonal Frequency Division Multiplexing (OFDM) signal. Such a calculation is described, for example, in Section A.4 of 3GPP Technical Specification 25.892, entitled "Technical Specification Group Radio Access Network; Feasibility Study for Orthogonal Frequency Division Multiplexing (OFDM) for UTRAN enhancement (Release 6)," (3GPP TS 25.892), version 6.0.0, June 2004, which is incorporated herein by reference. In alternative embodiments, unit 76 may calculate the effective SNRs using SNR averaging methods, such as methods based on Mutual Information (MU).

Table 1 below provides a list of the modulation schemes used in each MCS according to the LTE specifications. For each MCS the table additionally gives a corresponding typical averaging coefficient β and its inverse $\beta^{-1}$:

TABLE 1

| Predefined MCS set | | | |
| --- | --- | --- | --- |
| MCS Index | MCS Modulation scheme | Averaging index β | Inverse averaging index $\beta^{-1}$ |
| 1 | QPSK | 1.40 | 0.714 |
| 2 | QPSK | 1.42 | 0.704 |
| 3 | QPSK | 1.44 | 0.694 |
| 4 | QPSK | 1.49 | 0.671 |
| 5 | QPSK | 1.55 | 0.645 |
| 6 | QPSK | 1.61 | 0.621 |
| 7 | 16-QAM | 3.6 | 0.278 |
| 8 | 16-QAM | 4.5 | 0.222 |
| 9 | 16-QAM | 5.7 | 0.175 |
| 10 | 64-QAM | 12.5 | 0.0800 |
| 11 | 64-QAM | 16.0 | 0.0625 |
| 12 | 64-QAM | 20.0 | 0.0500 |
| 13 | 64-QAM | 25.0 | 0.0400 |
| 14 | 64-QAM | 32.0 | 0.0313 |
| 15 | 64-QAM | 38.0 | 0.0263 |

As depicted in Table 1, in the present example the predefined set of MCSs comprises three modulation schemes i.e., QPSK, 16-QAM, and 64-QAM, related to MCSs in the respective index ranges 1-6, 7-9, and 10-15.

Equation [1] can be equivalently written using a sum of exponents (referred to as SumExp) as follows:

$$\text{EFF\_SNR}(MCS) = -\beta(MCS) \cdot \log[\text{SumExp}(MCS)] \quad \text{Equation 2:}$$

wherein SumExp(MCS) is given by:

$$SumExp(MCS) = \frac{1}{N} \cdot \sum_{k=1}^{N} e^{-snr(k)/\beta(MCS)} \quad \text{Equation 3}$$

As shown in Table 1 above, the relationship between $\beta^{-1}$ and the MCS index, for MCSs that share a common modulation scheme (e.g., QPSK), is approximately linear. This behavior implies that for MCSs that share a common modulation scheme, instead of calculating SumExp(MCS) using Equation [3] above (for each MCS in the shared modulation scheme), SumExp(MCS) for a selected set of these MCSs can be well approximated by interpolating calculated SumExp values of other MCSs that employ the same modulation scheme. In an embodiment, for each index MCS whose SumExp(MCS) is approximated, the values of SumExp (MCS−1) and SumExp(M+1) are fully calculated.

For example, assume that Equation [3] is used to calculate SumExp(MCS) for MCS=1, 2, 3, namely the expressions SumExp1=SumExp(MCS=1), SumExp2=SumExp(MCS=2) and SumExp3=SumExp(MCS=3), respectively. Now let INTERP(·) denote an interpolation function. In some embodiments, INTERP(·) is a linear interpolation function. In alternative embodiments, INTERP(·) is a polynomial interpolation function. In yet other alternative embodiments INTERP(·) may comprise any other suitable interpolation function.

In an example embodiment, unit 76 calculates an interpolated exponential sum, denoted SumExp2', by calculating SumExp2'=INTERP(SumExp1, SumExp3). Additionally, EFF_SNR(MCS=2) is approximated as EFF_SNR'(MCS=2) by replacing SumExp(MCS=2) in Equation [2] with the interpolated result SumExp2'. Note that calculating SNR_EFF' (MCS) using interpolated SumExp'(MCS) is much more efficient than explicitly evaluating Equation [1] or [2]. The computational complexity is significantly reduced when the disclosed techniques employ linear interpolation, and for various other interpolation methods as well.

In an example embodiment, the calculation and estimation subsets are defined by the MCS index sets S1={1, 3, 4, 6, 7, 9, 10, 12, 13, 15} and S2={2, 5, 8, 11, 14}, respectively. In this embodiment, interpolation for MCSs in S2 is carried out based on calculated values of adjacent MCSs defined in S1. For example, in the 16-QAM modulation scheme, calculation is carried out for MCS=7 and MCS=9 and used to interpolate the result for MCS=8. Unit 76 uses Equations [2] and [3] to calculate effective SNR values for MCSs in S1. Then, unit 76 uses SumExp(MCS) results calculated using Equation [3] over MCSs in S1, to derive interpolated values SumExp' (MCS) for MCSs in S2 using interpolation formulas given in Table 2 below. Estimated values of effective SNR for MCSs in S2 are calculated by replacing SumExp(MCS) in Equation [2] with the respective interpolated SumExp'(MCS) value.

TABLE 2

Example interpolation scheme

| MCS in S2 | SumExp' (MCS) |
|---|---|
| 2 | [SumExp (MCS = 1) + SumExp (MCS = 3)] / 2 |
| 5 | [SumExp (MCS = 4) + SumExp (MCS = 6)] / 2 |
| 8 | [SumExp (MCS = 7) + SumExp (MCS = 9)] / 2 |
| 11 | [SumExp (MCS = 10) + SumExp (MCS = 12)] / 2 |
| 14 | [SumExp (MCS = 13) + SumExp (MCS = 15)] / 2 |

In another example embodiment, the calculation and estimation subsets are given by the respective MCS index sets S3={1, 6, 7, 9, 10, 15} and S4={2, 3, 4, 5, 8, 11, 12, 13, 14}. In this embodiment, only the first and last MCSs in each modulation scheme (defined in S3) are used for calculation and the results for all other MCSs (intermediate indices defined in S4) are interpolated. As in the previous example, unit 76 explicitly calculates effective SNR values for MCSs in the calculation set (i.e., S3) using Equations [2] and [3]. Approximate SumExp'(MCS) values in the estimation subset (i.e., S4) are calculated using interpolation formulas as summarized in Table 3:

TABLE 3

Example interpolation scheme

| MCS in S4 | SumExp' (MCS) |
|---|---|
| 2 | [4 • SumExp (MCS = 1) + SumExp (MCS = 6)] / 5 |
| 3 | [3 • SumExp (MCS = 1) + 2 • SumExp (MCS = 6)] / 5 |
| 4 | [2 • SumExp (MCS = 1) + 3 • SumExp (MCS = 6)] / 5 |
| 5 | [SumExp (MCS = 1) + 4 • SumExp (MCS = 6)] / 5 |
| 8 | [SumExp (MCS = 7) + SumExp (MCS = 9)] / 2 |
| 11 | [4 • SumExp (MCS = 10) + SumExp (MCS = 15)] / 5 |
| 12 | [3 • SumExp (MCS = 10) + 2 • SumExp (MCS = 15)] / 5 |
| 13 | [2 • SumExp (MCS = 10) + 3 • SumExp (MCS = 15)] / 5 |
| 14 | [SumExp (MCS = 10) + 4 • SumExp (MCS = 15)] / 5 |

In the embodiments described above, interpolated exponent sums are calculated for selected MCSs, and inserted into Equation [2] to derive respective estimated effective SNR values. In alternative embodiments, unit 76 directly performs interpolation on calculated EFF_SNR(MCS) values using any suitable interpolation function INTERP(·). For example, in some embodiments EFF_SNR(MCS=2) is calculated using linear interpolation, e.g., EFF_SNR'(MCS=2)=[(EFF_SNR(MCS=1)+EFF_SNR(MCS=3)]/2.

In an example embodiment, unit 76 calculates EFF_SNR (MCS) in the index sets S1 and S2 (defined above) by calculating EFF_SNR(MCS) for MCSs in S1 using Equation [1], and using interpolation formulas given in Table 2 with EFF_SNR replacing SumExp to calculate EFF_SNR'(MCS) for MCSs in S2. In another example embodiment, unit 76 divides the set of MCS indices into the sets S3 and S4 as defined above. Unit 76 uses EFF_SNR(MCS) values calculated over the set S3 (e.g., using Equation [1]) to derive interpolated EFF_SNR' (MCS) values for MCSs in S4. Unit 76 carries out the interpolation using interpolation formulas as defined in Table 3 with EFF_SNR replacing SumExp.

In some embodiments, CSI feedback estimation unit 70 calculates effective SNR for multiple combinations of transmission parameters in parallel. As described above, combination of parameters comprises a certain set of MCS (CQI), PMI, RI and BI values, or a subset of one or more of these parameters. The parallel cumulative calculation of the summation in Equation [1] or [2] for multiple transmission parameters requires large amounts of memory storage. By replacing the explicit calculation of SumExp or Eff_SNR with interpolation, in an embodiment, the memory requirements are reduced considerably.

The configuration of CSI feedback estimation unit 70 shown in FIG. 2 is an example configuration, which is depicted solely for the sake of clarity. In alternative embodiments, any other suitable configuration can also be used. For example, in an embodiment, any suitable division of the predefined set of MCSs into calculation and estimation subsets can be used. In the example embodiments described above, the estimation subsets comprise MCSs that share a common modulation scheme. In alternative embodiments, however, the estimation subset comprises MCSs of which at least two MCSs correspond to different modulation schemes.

As yet another example, in the embodiments described above, effective SNR values for MCSs in the estimation subset are estimated by interpolation. In alternative embodiments, however, the effective SNR for at least one MCS is estimated by extrapolation (or any other suitable estimation method) of effective SNR values calculated for other MCSs.

Figure 3:
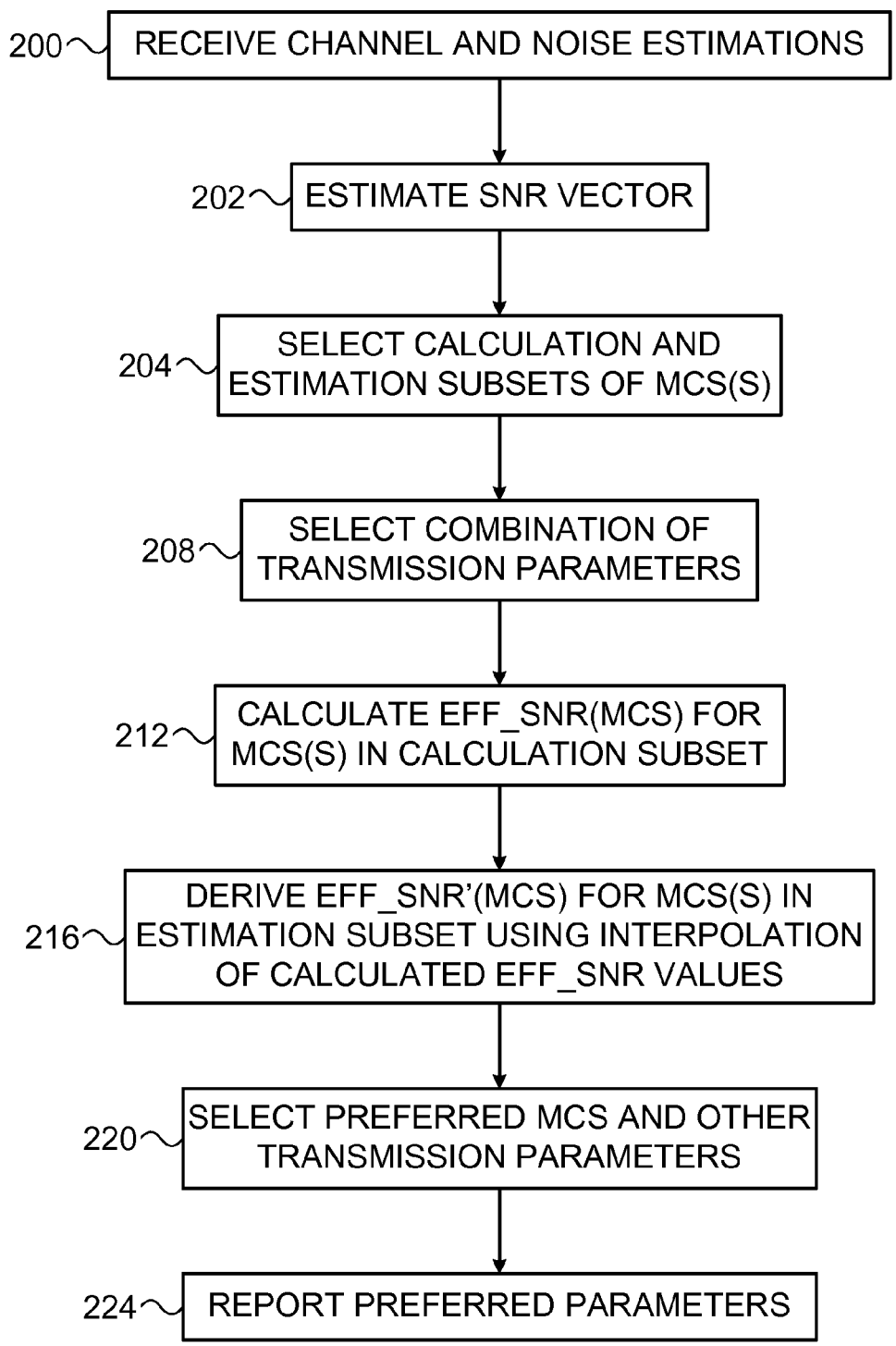
FIG. 3 is a flow chart that schematically illustrates a method for Modulation and Coding Scheme (MCS) selection carried out by the CSI feedback estimation unit of FIG. 2, in accordance with an embodiment that is described herein.

FIG. 3 is a flow chart that schematically illustrates a method for MCS selection, in accordance with an embodiment that is described herein. The following description refers to the method as being carried out by CSI feedback estimation unit 70 of UE processor 44 (FIG. 2). The method begins at a reception operation 200, with unit 70 receiving estimates of the channel response and noise covariance per time-frequency bin. SNR estimation unit 74 calculates SNR per time-frequency bin and outputs a respective SNR vector, at an SNR estimation operation 202. The SNR vector is delivered as input to unit 76.

At a subset selection operation 204, unit 70 divides the predefined set of MCSs into two disjoint (i.e., non-overlapping) subsets, denoted a calculation and estimation subsets. In the present embodiment, the predefined set of MCSs comprises fifteen MCSs indexed by the integers 1, 2, . . . , 15. The calculation subset comprises the MCSs whose index is in the set S1={1, 3, 4, 6, 7, 9, 10, 12, 13, 15} and the estimation subset comprises the MCSs whose index is in the set S2={2, 5, 8, 11, 14}. Considerations for defining S1 and S2 are described above. Unit 70 uses any of the disclosed calculation and interpolation methods for evaluating the effective SNR in the calculation and estimation subsets. In alternative embodiments, the calculation and estimation subsets of MCSs are predefined.

At a parameters selection operation 208, unit 70 selects transmission parameters such as PMI, RI, and BI as described (in FIG. 2) above. Unit 70 then calculates effective SNR, i.e., EFF_SNR(MCS) value, for each MCS in S1 (using unit 76). In the present embodiment, unit 76 calculates effective SNR values using Equations [2] and [3]. Next, at an interpolation operation 216, unit 76 derives estimated effective SNR values, i.e., EFF_SNR(MCS), for each MCS in the estimation set S2 by interpolating EFF_SNR values calculated at operation 212. In the present embodiment, unit 76 performs interpolation using linear interpolation formulas, for example, which are defined in Table 2 above.

At a parameters selection operation 220, unit 70 selects preferred MCS and other transmission parameters. The preferred MCS is selected out of the full set of predefined set of MCSs. The selection at operation 220 is carried out jointly by MCS predictor 78 and feedback selector 82 of unit 70. The method terminates at a reporting operation 224, in which unit 70 reports the selected transmission parameters to BS 28 (FIG. 1).

The UE, effective SNR calculation unit, estimation unit and CSI feedback estimation unit configurations shown in FIGS. 1-3 are example configurations, which are depicted solely for the sake of clarity. In alternative embodiments, any other suitable configuration can also be used. Some UE elements that are not mandatory for understanding of the disclosed techniques have been omitted from the figures for the sake of clarity. The different elements of these units may be implemented using dedicated hardware, such as using one or more Application-Specific Integrated Circuits (ASICs) and/or Field-Programmable Gate Arrays (FPGAs). Alternatively, some elements may be implemented using software executing on programmable hardware, or using a combination of hardware and software elements.

In some embodiments, some or all of the elements of a given UE, effective SNR calculation and estimation units, or CSI feedback estimation unit, are fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving reference signals in a mobile communication terminal, the mobile communication terminal being designed to receive data-carrying signals that are transmitted from a base station using one of multiple predefined Modulation and Coding Schemes (MCSs);
based on the received reference signals, calculating, using processing circuitry in the mobile communication terminal, effective Signal to Noise Ratios (SNRs) for the MCSs in a predefined partial subset of the MCSs that does not include all MCSs;
estimating the effective SNRs, for the MCSs that are not part of the predefined partial subset, by interpolating among two or more calculated effective SNR measures of the MCSs in the predefined partial subset using an interpolation function;
calculating channel feedback based on the calculated effective SNRs and the estimated effective SNRs; and
transmitting the channel feedback from the terminal, for use in transmitting the data carrying signals from the base station.

2. The method according to claim 1, wherein calculating the effective SNRs comprises measuring a plurality of SNRs in respective time-frequency bins, and applying an Exponential Effective Signal to Interference and Noise Ratio Mapping (EESM) process to the SNRs.

3. The method according to claim 1, wherein each of the multiple MCSs is associated with a respective modulation scheme and a respective coding scheme, and wherein estimating the effective SNRs comprises estimating an effective SNR for a given MCS by interpolating, using the interpolation function, among two or more effective SNR measures of respective MCSs having a same modulation scheme as the given MCS.

4. The method according to claim 1, wherein estimating the effective SNRs comprises measuring a plurality of SNRs in respective time-frequency bins, deriving each of the effective SNR measures by calculating a sum of exponents of the SNRs and taking a logarithm of the sum of exponents, and interpolating among two or more sums of exponents using the interpolation function, and wherein estimating the effective SNRs comprises taking the logarithm of each of the respective interpolated sums of exponents.

5. The method according to claim 1, wherein the effective SNR measures comprise the respective effective SNRs, and wherein estimating each of the effective SNRs comprises interpolating among two or more effective SNRs using the interpolation function.

6. The method according to claim 1, wherein the interpolation function comprises a linear interpolation function.

7. The method according to claim 1, wherein calculating the effective SNRs comprises calculating the effective SNRs as a function of respective values of an averaging parameter β assigned to the MCSs.

8. Apparatus, comprising:
- a receiver, which is configured to receive reference signals, and to receive data-carrying signals that are transmitted from a base station using one of multiple predefined Modulation and Coding Schemes (MCSs);
- processing circuitry, which is configured to calculate, based on the received reference signals, effective Signal to Noise Ratios (SNRs) for the MCSs in a predefined partial subset of the MCSs that does not include all MCSs, to estimate the effective SNRs for the MCSs that are not part of the predefined subset by interpolating among two or more effective SNR measures of the MCSs in the predefined partial subset using an interpolation function, and to calculate channel feedback based on the calculated effective SNRs and the estimated effective SNRs; and
- a transmitter, which is configured to transmit the channel feedback from the terminal, for use in transmitting the data carrying signals from the base station.

9. The apparatus according to claim 8, wherein the processing circuitry is configured to calculate the effective SNRs by measuring a plurality of SNRs in respective time-frequency bins, and applying an Exponential Effective Signal to Interference and Noise Ratio Mapping (EESM) process to the SNRs.

10. The apparatus according to claim 8, wherein each of the multiple MCSs is associated with a respective modulation scheme and a respective coding scheme, and wherein the processing circuitry is configured to estimate the effective SNR of a given MCS by interpolating, using the interpolation function, among two or more effective SNR measures of respective MCSs having a same modulation scheme as the given MCS.

11. The apparatus according to claim 8, wherein the processing circuitry is configured to estimate the effective SNRs by measuring a plurality of SNRs in respective time-frequency bins, deriving each of the effective SNR measures by calculating a sum of exponents of the SNRs and taking a logarithm of the sum of exponents, and interpolating among two or more sums of exponents using the interpolation function, and to estimate the effective SNRs by taking the logarithm of each of the respective interpolated sums of exponents.

12. The apparatus according to claim 8, wherein the effective SNR measures comprise the respective effective SNRs, and wherein the processing circuitry is configured to estimate each of the effective SNRs by interpolating among two or more effective SNRs using the interpolation function.

13. The apparatus according to claim 8, wherein the interpolation function comprises a linear interpolation function.

14. The apparatus according to claim 8, wherein the processing circuitry is configured to calculate the effective SNRs as a function of respective values of an averaging parameter β assigned to the MCSs.

15. A mobile communication terminal comprising the apparatus of claim 8.

16. A chipset for processing signals in a mobile communication terminal, comprising the apparatus of claim 8.

* * * * *